United States Patent [19]

Barone

[11] Patent Number: 4,593,672

[45] Date of Patent: Jun. 10, 1986

[54] FUEL ECONOMY APPARATUS

[76] Inventor: Tomas Barone, Julian Navarro 2838, 1643 Beccar, Argentina

[21] Appl. No.: 670,330

[22] Filed: Nov. 9, 1984

[30] Foreign Application Priority Data

Nov. 11, 1983 [AR] Argentina .............. 294786

[51] Int. Cl.$^4$ .................. F02M 25/06; F02M 25/08
[52] U.S. Cl. .................. 123/568; 123/573; 123/518
[58] Field of Search .............. 123/568, 572, 573, 574, 123/518

[56] References Cited

U.S. PATENT DOCUMENTS

| | | | |
|---|---|---|---|
| 3,731,665 | 5/1973 | Garcea | 123/572 X |
| 3,844,260 | 10/1974 | Scott, Jr. et al. | 123/572 X |
| 3,846,980 | 11/1974 | DePalma | 123/572 X |
| 4,237,840 | 12/1980 | Figueiras | 123/572 X |
| 4,270,508 | 6/1981 | Lindberg | 123/568 |

FOREIGN PATENT DOCUMENTS

| | | | |
|---|---|---|---|
| 0224482 | 7/1982 | Argentina . | |
| 0539259 | 6/1922 | France | 123/572 |
| 0135927 | 10/1979 | Japan | 123/568 |

Primary Examiner—W. R. Wolfe
Attorney, Agent, or Firm—Barnes & Thornburg

[57] ABSTRACT

An apparatus containing a first gas chamber having a plurality of inlets is provided for collecting undesirable gaseous emissions. Each of the inlets includes a device for adjusting the flow of gas into the chamber. A second gas chamber is provided adjacent the first gas chamber and a plurality of passageways are provided between the two chambers. A regulating system is provided to control the flow of gas from the first gas chamber through each passageway to the second gas chamber in response to predetermined operating conditions of the motor. An outlet from the second gas chamber, which includes a flow adjusting element, directs the gases to an intake of the motor where the undesirable gaseous emissions can be consumed.

7 Claims, 4 Drawing Figures

FUEL ECONOMY APPARATUS

This invention is related to improvements in the equipment applicable to an internal combustion motor and is intended to improve the motor's performance by means of fuel and oil economy and, in addition, to reduce the toxicity of the exhaust gases of motor powered vehicles.

At least one such piece of equipment is known to fulfill the same general purpose and it is patented under Argent Pat. No. 224.482. By examining this patented equipment, one can determine a series of fundamental advantages of the present invention, prominently among which is its construction simplicity which translates into a reduction of manufacturing cost as well as a greater degree of safety for correct operation. Also, the manpower for the installation of the equipment is appreciably reduced, and frequent repairs or maintenance of a strictly mechanical order are nonexistent or reduced.

In summary, among the most important functions of the equipment constructed in accordance with the present invention, the following are prominent:

1. Recirculation of fuel gases which normally are emanated to the outside.
2. Realization of a true ventilation of the motor crankcase with clean air.
3. Optimization of the conditions of the fuel mixture in order to obtain a maximum energetic use.
4. Reduction of the maximum temperature of the combustion in order to avoid the formation of nitrogenous compounds.
5. Improvement of combustion in order to avoid the formation of carbon monoxide.

The result achieved by the combination of these factors is to REDUCE the effective fuel consumption. It is important to emphasize that in other systems which may function similar to the present system to reduce contaminating gaseous emissions, the fuel consumption is INCREASED without any exception.

The present invention generally comprises an apparatus containing a first gas chamber having a plurality of inlets for collecting undesirable gaseous emissions. Each of the inlets includes means for adjusting the flow of gas into the chamber. A second gas chamber is provided adjacent the first gas chamber and a plurality of passageways are provided between the two chambers. Means are provided to control the flow of gas from the first gas chamber through each passageway to the second gas chamber in response to the operating condition of the motor. An outlet from the second gas chamber, which includes a flow adjusting element, directs the gases to an intake of the motor where the undesirable gaseous emissions can be consumed.

Many technical and functional advantages are presented by the present invention which has made the originally conceived equipment definitively and fully surpassed by that now developed. The new equipment will be described in the next pages with a corresponding series of drawings provided as simple, illustrated examples which are in no way restrictive and in which one can note that:

In the different figures, the same reference numbers indicate the same or corresponding parts.

Figure 1:
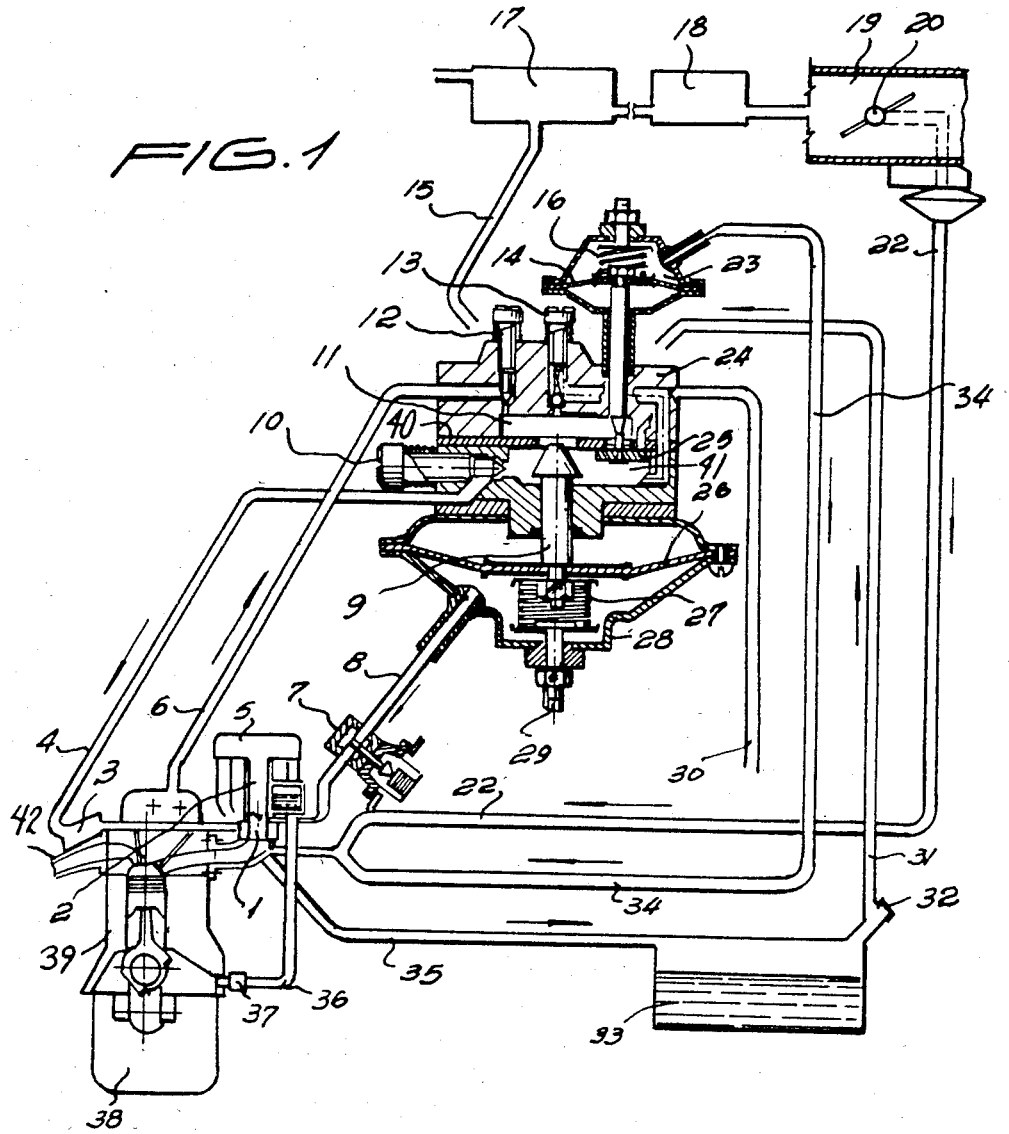
FIG. 1 illustrates the invention in side elevation view with some apparatus in partially longitudinal section.
Figure 2:
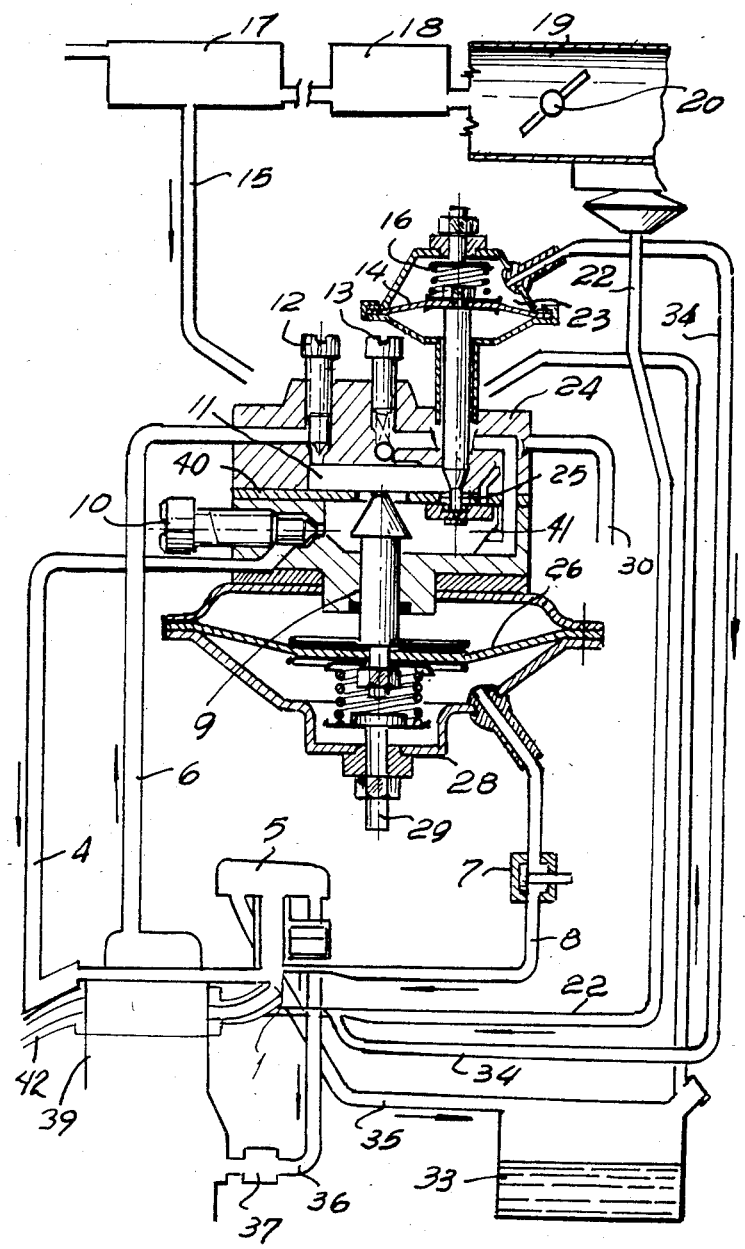
FIG. 2 is a view similar to FIG. 1 with the motor operating at cruising speed.
Figure 3:
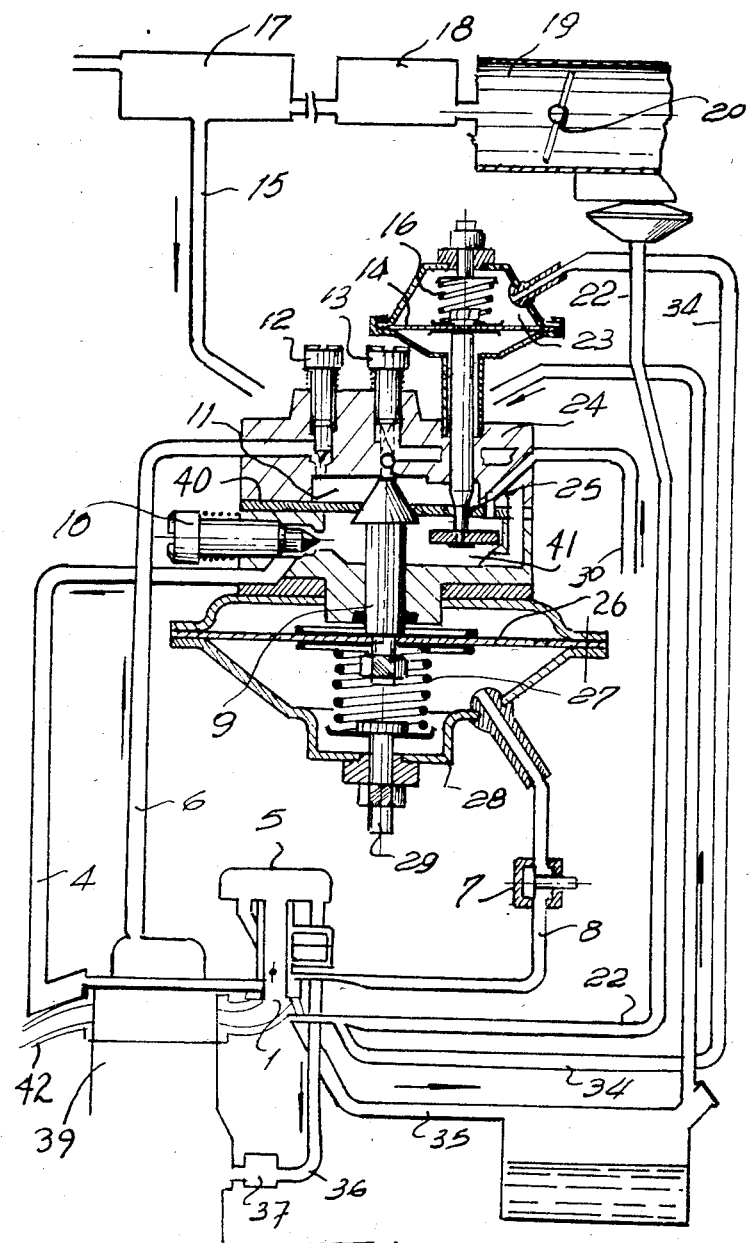
FIG. 3 is a view similar to FIG. 1 with the motor undergoing acceleration.
Figure 4:
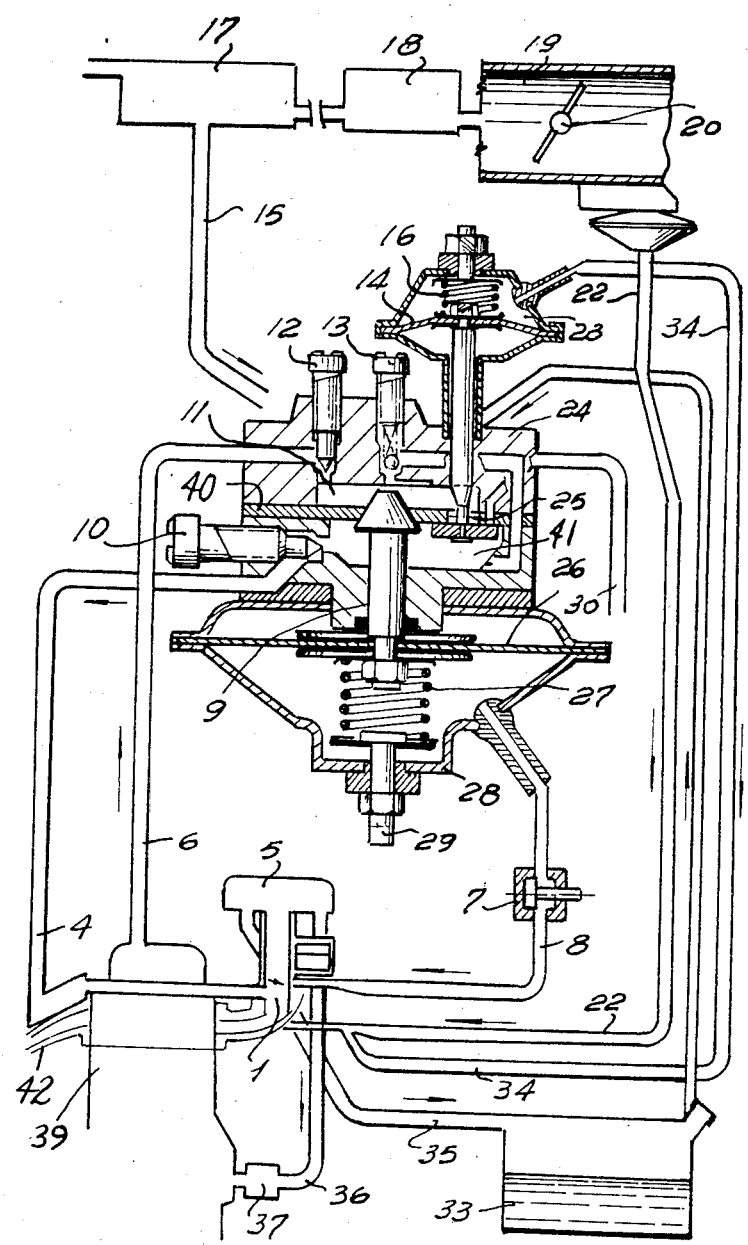
FIG. 4 is a view similar to FIG. 1 with the motor idling.

In accordance with the illustrations, the apparatus of the present invention comprises generally a regulating device connected to the filler neck 32 of the fuel tank 33, to the crankcase 38 of the motor 39 and to the exhaust system 17. This regulating device includes a transducer unit 28 which provides a chamber divided by a diaphragm 26 into two sub-chambers. The lower chamber acts as a vacuum chamber which, through a connecting pipe 8 in which a thermostat 7 is inserted, is connected to the suction intake of the motor through a carburetor 2. A spring 27 is positioned in the vacuum sub-chamber and supports the diaphragm 26. The regulator screw 29 will permit the regulation, at will, of the spring force of spring 27 and, therefore, the elasticity of the diaphragm 26.

On the other side of said diaphragm there is provided a stem 9 which includes a stopper head which is positioned in a mixing chamber 11 of the body 24. The stopper head controls the flow of gas through the main opening in the partition 40 separating the mixing chamber 11 from the lower gas collection chamber 41.

The second diaphragm 14 controls the forced speed or acceleration valve 25 which, contrary to the main valve 9, opens before a reduction of the vacuum. The acceleration valve also controls the opening to pipe 30 which is open to the atmosphere. This condition will be explained in detail later.

In practice, the body 24 of the regulating device and the transducer unit 28 containing the diaphragm 26 are preferably independent pieces which can be interconnected by means of bolts or other conventional fasteners.

On top of the stopper head of the stem 9, one can observe that it acts in an operative relation with an opening in the intermediate barrier 40 which separates the lower gas collector chamber 41 from the upper chamber 11 which mixes the gases proceeding from the fuel tank 33, the crankcase 38, and the exhaust pipe 17.

For this purpose, the fuel tank 33, crankcase 38, and exhaust pipe 17 must provide the necessary means for the installation of the respective pipes 6, 15, and 31 which, in turn, are connected into respective intakes to body 24 with regulators 12, which will allow for a fine adjustment of the flow of gases into the body 24. A clarification becomes necessary at this point: only one connector intake with its corresponding regulator 12 has been depicted on the drawings. The understanding is that the other intakes and regulators have the same physical characteristics. They have not been illustrated for the simple reason of not wishing to complicate said drawings, especially without the benefit of any other interpretation.

The assembly includes a slow speed regulator 13, including a combination of a spring and a ball in the passage which affords direct communication between the gas mixing chamber 11 and the lower collector chamber, without passing through the intermediate partition past the stopper head of the piston 9.

From the collector chamber, one can observe that a return pipe 4 is also provided with a regulator 10 capable of allowing the regulation, at will, of the exit flow of the gases recovered and mixed in the chamber 11.

The return pipe 4 is connected, through a carburetor 2, with the intake manifold of the motor, by the insertion of the heating chamber 3 back-to back to the exhaust manifold 42. A flange pipe 1 produces circular movements of gases and coming from the chamber 3 as indicated. A ventilation pipe 36 introduces filtered air to the crank case 38 and holds an inserted oil separator 37.

To facilitate the explanation of the operation of the equipment, it is pointed out that the ventilation pipe 35 coupling the fuel tank 36 with the air filter 5 carries filtered air toward the fuel tank 33 from the carburetor 2. Therefore, with the motor stopped, the fuel tank 33 is ventilated through pipe 35 and filter 5, while the thermostatic valve 7 remains shut.

On the other hand, when the motor is running and when it reaches its normal temperature, the said valve 7 will open and the vacuum or depression of the intake will act on the diaphragm 26. The latter will pull the stem 9, opening the way for the gases to pass through the intake opening by the stopper head, in accordance with the requirements of the motor. Thus the fuel tank 36 and crankcase 38 are continuously flushed with clean filtered air during warm running operation of the motor.

The movement of the diaphragm 26 is controlled by the vacuum generated in the intake and is attained by the connection of the pipes that feeds the compensator from the advance of the ignition.

The gases to be recovered enter to the regulator and they are controlled in the following manner:

(1a) From the crankcase 38 of the motor through the pipe 6 and regulated by the entrance regulator screw 12;

(2) From the fuel tank 33 through the pipe 31 and regulated by a screw equal to 12:

(3a) From the exhaust presilencer (pre-muffler) 17 through the pipe 15 and regulated by a screw equal to No. 12. This is supported by intake to the valve 20, located in the exhaust pipe 19, adjacent the silencer (muffler) 18, at the end of the exhaust system, and controlled by an actuator located in the vacuum pipe 22.

These gases mix together in the mixing chamber 11 according to the speed of the motor. Then they exit and are regulated by the calibrator 13 at slow speed, through the opening of the main piston valve 9 at regular speed, and through the opening of valve 25 during acceleration, valve 25 being opened by transducer unit 23 connected by the vacuum pipe 34.

The resulting mixture goes through the return pipe 4 to the gas heating chamber 3, preheated by the exhaust manifold 42 and is absorbed by the intake of the motor through the gas flange 1. Described and illustrated in such manner, it is possible to appreciate the advantages of performance described above which are the consequences of the combination of factors also established above.

As a result of the use of the present invention, fuel consumption is observed to decrease by as much as 20%. Effective reduction of the toxicity of exhaust gases for any condition of speed is also observed. Positive ventilation of the oil crankcase also is provided which extends the useful life of the lubricant and of the motor as well.

In motors with spark ignition, a reduction of the tendency of the motor to exhibit spontaneous combustion of the fuel mixture, even with the high compression relation, is evident.

The basic characteristic of the motor is not altered, but a better quality of reaction of the engine is experienced.

By means of an incorporated altimetric control (manual or automatic), the invention counteracts any decrease of performance of the motor when working at high altitudes.

On the other hand, the simplicity of its operating principle allows its adaptation to any kind of motor (spark ignition or diesel) at a cost noticeably lower than any other equivalent system of exhaust gas treatment and without the need of having to resort to heavy maintenance for the equipment.

What is claimed is:

1. An apparatus for treating combustion gases in a motor vehicle having a motor assembly including a crankcase, intake manifold, and suction intake, a fuel tank formed to include an upper part, an exhaust pipe, a regulating device disposed before the intake manifold, and gas return pipe means for coupling each of the fuel tank, crankcase, and exhaust pipe to the regulating device in fluid communication and characterized by said regulating device including a unit providing a chamber divided by a diaphragm into two sub-chambers, of which one is a vacuum sub-chamber connected by means of a connector pipe, to the suction intake of the motor, a thermostat being inserted in the connector pipe, the same sub-chamber having a compression spring lodged against said diaphragm; a stem projecting from the other side of the diaphragm having a stopper head placed in an operative relation in a mixing chamber situated in the unit, the mixing chamber having an opening to the environment, and an intermediate partition; the mixing chamber including additional openings by way of individual regulators to the upper part of the fuel tank, the crankcase of the motor, and the exhaust pipe, respectively; an outlet on the other side of the intermediate partition in the mixing chamber including a regulator for circulating recovered and mixed gas to a pipe connecting with a preheating chamber adjacent at the intake manifold of the motor, the mixing chamber being permanently joined to a gas collector chamber by means of a passage controlled by a regulator; and acceleration valve means for allowing the gas to circulate at a speed required by the motor so that the vacuum-actuated diaphragm, the regulator, and the acceleration valve means cooperate in response to predetermined operating conditions of the motor during a momentary reduction in speed to deliver a continuous flow of recovered and mixed gas to the intake manifold for recombustion resulting in improved fuel economy.

2. Apparatus for use in combination with an internal combustion motor for controlling unwanted emissions therefrom by causing recirculation of gases in selective response to predetermined motor operating conditions, the apparatus comprising: a body including a first gas chamber having a plurality of inlets for unwanted gaseous emissions, means for adjusting the opening of each inlet, a second gas chamber, control means for controlling the flow of gas from the first chamber to the second chamber in response to predetermined motor operating conditions, means for directing the gas from the second chamber to an intake of the motor, and means for controlling flow of gases through the directing means, one of said control means includes a screw for adjusting the amount of gas recirculating during an idling condition.

3. Apparatus for use in combination with an internal combustion motor for controlling unwanted emissions therefrom by causing recirculation of gases in selective response to predetermined motor operating conditions, the apparatus comprising: a body including a first gas chamber having a plurality of inlets for unwanted gaseous emissions, means for adjusting the opening of each inlet, a second gas chamber, control means for controlling the flow of gas from the first chamber to the second chamber in response to predetermined motor operating conditions, means for directing the gas from the second chamber to an intake of the motor, and means for controlling flow of gases through the directing means, the body including the first and the second chamber and a common wall therebetween, the common wall including openings which permit gas to flow from the first to the second chamber, the openings being selectively closed by said control means.

4. In a vehicle having a motor crankcase, a motor exhaust system, and a fuel tank having a top, the apparatus of claim 3, wherein the inlets to the first gas chamber are connected to the motor crankcase, the motor exhaust system and the top of the fuel tank.

5. The apparatus of claim 3, wherein one of said control means comprises a vacuum chamber connected through a pipe to a motor intake, the pipe including a thermostatically controlled valve which is normally closed when cold, the valve being thermally responsive to a predetermined exhaust manifold temperature to permit operation of the one control means only when the motor is warm.

6. The apparatus of claim 3, wherein one of said control means comprises a vacuum chamber and responsive to an accelerating condition of the motor to open a passageway in the common wall and further open an inlet connected to the atmosphere.

7. The apparatus of claim 3, wherein the directing means includes a gas heating chamber fixed back-to-back to a motor exhaust manifold.

* * * * *

UNITED STATES PATENT AND TRADEMARK OFFICE
CERTIFICATE OF CORRECTION

PATENT NO. : 4,593,672
DATED : June 10, 1986
INVENTOR(S) : Tomas Barone

It is certified that error appears in the above-identified patent and that said Letters Patent is hereby corrected as shown below:

In column 4, line 65, replace "includes" with --including--.

Signed and Sealed this

Twenty-third Day of September 1986

[SEAL]

Attest:

DONALD J. QUIGG

Attesting Officer

Commissioner of Patents and Trademarks